United States Patent
Kearsley

(10) Patent No.: US 9,723,855 B2
(45) Date of Patent: Aug. 8, 2017

(54) CONFECTIONERY PRODUCT

(71) Applicant: Mondelez UK Holdings & Services Limited, Middlesex (GB)

(72) Inventor: Malcolm Kearsley, Reading (GB)

(73) Assignee: Mondelez UK Holdings & Services Limited, Middlesex (GB)

(*) Notice: Subject to any disclaimer, the term of this patent is extended or adjusted under 35 U.S.C. 154(b) by 346 days.

(21) Appl. No.: 14/501,419

(22) Filed: Sep. 30, 2014

(65) Prior Publication Data

US 2015/0017279 A1  Jan. 15, 2015

Related U.S. Application Data

(62) Division of application No. 12/743,991, filed as application No. PCT/GB2008/003892 on Nov. 20, 2008, now Pat. No. 8,877,268.

(30) Foreign Application Priority Data

Nov. 20, 2007 (GB) .................................. 0722704.4

(51) Int. Cl.
| | |
|---|---|
| A23G 1/54 | (2006.01) |
| A23P 10/30 | (2016.01) |
| A23G 1/32 | (2006.01) |
| A23G 3/36 | (2006.01) |
| A23G 3/54 | (2006.01) |
| A23G 4/06 | (2006.01) |
| A23G 4/20 | (2006.01) |

(52) U.S. Cl.
CPC ............... *A23G 1/54* (2013.01); *A23G 1/32* (2013.01); *A23G 3/36* (2013.01); *A23G 3/54* (2013.01); *A23G 4/06* (2013.01); *A23G 4/20* (2013.01); *A23P 10/30* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 3,843,819 A | 10/1974 | Rostagno | |
| 4,933,190 A | 6/1990 | Cherukuri et al. | |
| 5,204,029 A * | 4/1993 | Morgan | B01J 13/04 264/4.4 |

(Continued)

FOREIGN PATENT DOCUMENTS

| | | |
|---|---|---|
| EP | 0064155 B1 | 11/1982 |
| GB | 1372315 | 10/1974 |

(Continued)

OTHER PUBLICATIONS

ADM—Sorbitol Solution, USP/FCC, viewed Apr. 8, 2014: http://www.adm.com/_layouts/pdf.aspx?techdocid=6647&src=ECachedSimilar.

(Continued)

*Primary Examiner* — Elizabeth Gwartney
(74) *Attorney, Agent, or Firm* — Hoffmann & Baron, LLP

(57) ABSTRACT

The invention relates to a confectionery product comprising a plurality of beads, each bead comprising an aqueous core, a hydrophobic first coating layer surrounding the aqueous core, and a hydrophilic second coating layer surrounding the first coating layer; to a confectionery product comprising these beads. The invention also relates to a method of production thereof.

9 Claims, 1 Drawing Sheet

(56) References Cited

U.S. PATENT DOCUMENTS

| | | |
|---|---|---|
| 5,206,042 A | 4/1993 | Dave et al. |
| 5,445,843 A | 8/1995 | Beckett |
| 2001/0021404 A1 | 9/2001 | Uhlemann et al. |
| 2005/0084603 A1 | 4/2005 | Kaiser et al. |
| 2006/0263476 A1 | 11/2006 | Jani et al. |
| 2006/0286200 A1 | 12/2006 | Castro et al. |

FOREIGN PATENT DOCUMENTS

| | | |
|---|---|---|
| GB | 2388581 A | 11/2003 |
| WO | 9815192 A1 | 4/1998 |
| WO | 9956561 A1 | 11/1999 |
| WO | 03088756 A2 | 10/2003 |
| WO | 2005048728 A1 | 6/2005 |
| WO | 2005074701 A1 | 8/2005 |
| WO | 2006113265 A2 | 10/2006 |
| WO | 2007019882 A1 | 2/2007 |
| WO | 2007070754 A2 | 6/2007 |

OTHER PUBLICATIONS

Annunziata et al., "Effect of polyethylene glycol on the liquid-liquid phase transition in aqueous protein solutions" in PNAS, Oct. 29, 2002, vol. 99, No. 22, p. 14165-14170.

OEC Fluid Handling Inc—"General Viscosity Information"—http://www.oecfh.com/downloands/viscosity-information.pdf.

* cited by examiner

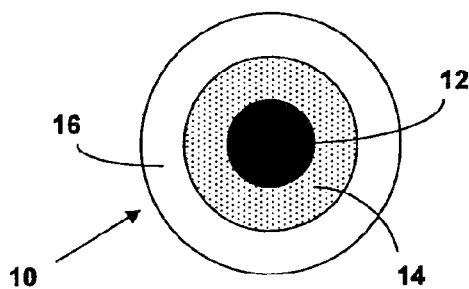
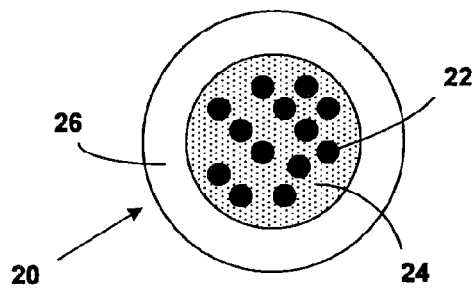
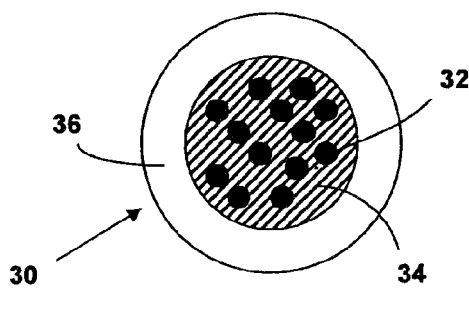
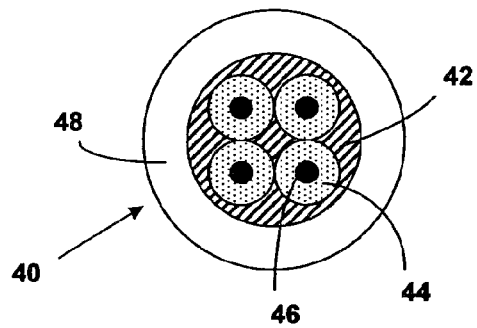
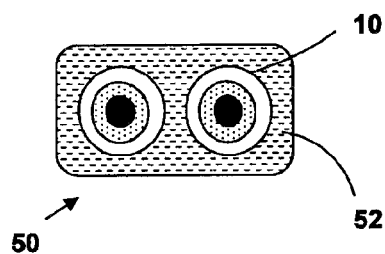

CONFECTIONERY PRODUCT

CROSS-REFERENCE TO RELATED APPLICATIONS

This application is a Divisional of U.S. patent application Ser. No. 12/743,991, filed Sep. 1, 2010, which is the National Stage of International Application No. PCT/GB2008/003892, filed Nov. 20, 2008, which claims benefit of Great Britain Application. No. 0722704.4, filed Nov. 20, 2007, the contents of all of which are incorporated by reference herein.

FIELD OF THE INVENTION

The invention relates to confectionery products and components thereof. In particular, the invention relates to confectionery products which incorporate a plurality of beads and to the associated methods of production.

BACKGROUND OF THE INVENTION

Many confectionery products include coatings, the coating may be hard, for instance many chocolate products are encased in a hard, often flavoured, sugar coating. One such coating is exemplified by WO 03/088756 which describes a mint tablet coated with three distinct coating layers. The first (innermost) layer surrounding the mint tablet comprising a fat, the second layer comprising a hard sugar shell and the third layer containing film forming agents. Soft coatings are also known, for instance jelly bean products comprise soft, jelly-like centres encased in a soft panned coating.

Some confectionery products will have a liquid centre at room temperature, for instance a chocolate liqueur will typically be formed from a hollow chocolate casing into which the liquid liqueur centre is placed.

Some confectionery will incorporate bubbles and microcapsules, the presence of bubbles in a chocolate product creates a smooth sensation as the chocolate melts creating the illusion that the chocolate is melting more quickly. Aerated candies are also known, for instance cinder toffee is an aerated form of toffee, wherein the bubbles create a tingling, crackling sensation when the toffee is consumed.

Microcapsules containing flavourings, such as those described in WO 91/17821 are often utilised to delay and extend the flavour release of a comestible. Such capsules are typically formed by spray drying the flavouring onto a solid matrix.

However, there remains a need in the confectionery industry for products and product components which offer a different and unusual sensory experience.

SUMMARY OF THE INVENTION

Accordingly, in a first embodiment of the invention there is provided a confectionery product comprising a plurality of beads, each bead comprising an aqueous core, a hydrophobic first coating layer surrounding the aqueous core, and a hydrophilic second coating layer surrounding the first coating layer.

The provision of a stable aqueous bead allows for the inclusion of such beads in comestible products, particularly in confectionery products where they can offer a pleasing "liquid burst" or other sensation during consumption.

In a further embodiment of the invention, there is also provided a method of preparing a confectionery product comprising the steps of:

a. preparing an emulsion of an aqueous core material and a hydrophobic first coating material;
b. forming droplets of emulsion, thereby providing a droplet with an aqueous core and a hydrophobic first coating layer;
c. coating the droplets with a second coating material to form an bead with a second coating layer surrounding the first coating layer; and
d. incorporating a plurality of beads into the confectionery product.

In an additional embodiment, there is provided a confectionery bead comprising at least one aqueous core, a hydrophobic first coating layer comprising an emulsion and/or fat surrounding the at least one aqueous core, and a hydrophilic second coating layer surrounding the first coating layer.

In this embodiment, the term "aqueous core", in relation to a first coating comprising an emulsion, is intended to mean a portion of the bead which is substantially larger than the water droplets which are equally dispersed throughout the oil phase of the emulsion.

In a yet further embodiment, there is provided a method of preparing a confectionery bead comprising the steps of:

a. preparing an emulsion of an aqueous core material and a hydrophobic first coating material;
b. forming droplets of emulsion, thereby providing a droplet with an aqueous core and a hydrophobic first coating layer; and
c. coating the droplets with a second coating material to form an bead with a second coating layer surrounding the first coating layer.

Step (b) of the method may comprise a number of means for forming a droplet with an aqueous core and a hydrophobic first coating layer. Step (b) may comprise heating the emulsion to a temperature sufficient to allow the emulsion to flow, forming small droplets of the emulsion, and cooling the droplets to a temperature sufficient to solidify the emulsion. Forming the small droplets may be by means of a simply dispensing emulsion from a nozzle and subsequently cooling the droplets in a refrigerant or a cooling apparatus. Forming the droplets may involve some form of processing so as to allow disassociation of the aqueous material from the hydrophobic material in the emulsion. The act of cooling the droplets may facilitate such a disassociation. Step (b) may be implemented by means of a jet-cutting process.

DETAILED DESCRIPTION OF THE INVENTION

Components

The bead typically comprises at least an aqueous core, a hydrophobic first coating layer, and a hydrophilic second coating layer. Additional layers may be present in some embodiments, these may be hydrophobic or hydrophilic. However, it is envisaged that the aqueous core will always be surrounded directly by a hydrophobic first coating layer as described herein.

In one embodiment, the first coating later comprises an emulsion. The emulsion may comprise a water-in-oil emulsion. Such a water-in-oil emulsion may form the first coating layer which coats one or more aqueous cores (such as water droplets). If desired, an oil-in-water-in-oil emulsion may be employed. The second coating material may be a soft-panned sugar or sugar substitute coating.

Aqueous Core Material

The aqueous core material may be water, a combination of water and carbohydrate, and suspensions of materials in water. Further, the core may contain other wholly or partially dissolved solutes. The solutes may be selected from sweeteners (including bulk and intense sweeteners), cooling agents, carboxylic acid salts, colourings, flavourings, warming agents, tingling agents, taste potentiators, umami, kokumi, saltiness, breath fresheners, oral care products (including tooth whiteners, stain removers, anti-calculus agents, remineralisation agents and anti-plaque agents), pharmaceuticals (including medications, herbs, and nutritional supplements), antibacterial agents, preservatives, antioxidants, and combinations thereof.

It is particularly preferred that the solutes are selected from sweeteners, cooling agents, colourings and/or flavourings. However in some embodiments the core may additionally or alternatively include oral care products and/or pharmaceuticals. The presence of these components would offer a product with health benefits.

Where present the sweeteners preferably comprise from 1-99 wt % of the aqueous core material, often 5-95 wt %, in some instances 15-90 wt %, alternatively 25-75 wt % of the aqueous core material. Where it is desirable that the aqueous core material be of high viscosity, this may be achieved by increasing the level of sweetener solute or selection of an appropriate higher molecular weight carbohydrate, particularly where the sweetener is a sugar compound. An aqueous core containing high levels of sugar will form a viscous sugar syrup.

Suitable sugars for use in the present invention include, by way of example, those selected from the groups comprising monosaccharides, disaccharides, and polysaccharides. Suitable monosaccharides typically have from three to six carbon atoms in the ring structure. Suitable disaccharides may be selected from, for example, sucrose, lactose, maltose, trehalose, or cellobiose. Suitable oligo- or polysaccharides may be selected from, for example, glucose syrups or maltodextrins.

Preferred sugars are those selected from monosaccharide (for example, galactose, glucose, mannose, fructose, or tagatose) and disaccharide (for example, sucrose, lactose, maltose, trehalose or cellobiose) carbohydrates. The sugars may be used alone or in any suitable combination.

Sugar alcohols may also be present in the aqueous core material of the invention. Sugar alcohols are a hydrogenated or partially hydrogenated form of carbohydrate in which the carbonyl group (aldehyde or ketone) is reduced to a primary or secondary hydroxyl group. Sugar alcohols may be used as replacements for all sugars and glucose syrups in foodstuffs, and may be combined with high intensity artificial sweeteners (such as aspartame for example) to counter their low sweetness. Suitable sugar alcohols may include those derived from disaccharides or monosaccharides, for instance, erythritol, isomalt, lactitol, maltitol, mannitol, sorbitol, xylitol, or any combination thereof and also maltitol syrups and polyglycitols. Particularly preferred sugar alcohols include maltitol, xylitol, mannitol, erythritol, sorbitol and maltitol syrup.

In some embodiments the aqueous core material may offer a cooling effect, in such instances it is preferred that this is obtained by adding a sugar alcohol to the aqueous core material, although any known cooling agent may be used. The sugar alcohols which are most preferred for providing the desired cooling effect are sorbitol, xylitol and erythritol. It is also preferred that any sugar alcohol present be included as small crystals, as it is this crystalline form which offers the most effective cooling sensation upon consumption.

Where added to provide a cooling effect, it is preferred that the sugar alcohol comprise from 10-99 wt % of the aqueous core material, often 60-90 wt %, in some instances 65-80 wt %, of the aqueous core material.

The level of flavouring and colouring used, where present, will depend heavily upon the nature of the flavouring or colouring and the intensity desired in any particular application, as would be readily understood by the person skilled in the art. However, in general, the flavouring or colouring are each independently present in amounts from 0.001-5.0 wt % and, more specifically, from 0.05-4.0 wt %, and even more specifically, 0.1-3.0 wt % of the aqueous core.

The core material may be a liquid, gel, or semi-solid. It is generally preferred that the viscosity of the core be in the range 1-250,000 centipoise, as measured using a Brookfield viscometer at 25° C. In many instances, the viscosity will be in the range 1-50,000 cps, often 100-10,000 cps.

As noted above, the core material may be a liquid at typical room temperatures such as at temperatures in the range 15-25° C. In such embodiments, a liquid burst sensation is offered upon consumption. Preferably, however, the liquid core material of these embodiments is liquid at temperatures in the range 5-90° C., in particular 0.5-100° C. to allow the beads to be subjected to a large flexibility of processing and storage conditions without any damage to the bead such as would arise from solidification of the aqueous core, or vaporisation, both of which lead to expansion of the core and rupturing of the bead.

Preferably the viscosity of a liquid core material will be in the range 1-1000 centipoise, in some examples 1-200 cps as a less viscous liquid will have a greater "liquid burst" impact upon rupturing of the bead.

Where the aqueous core material is a gel or semi-solid the core is intended to be gelatinous or semi-solid at room temperature as described above. However, providing that the gel or semi-solid core material is stable to processing at higher temperatures, and that the structure will reform once cooled, it is not necessary for the aqueous core to remain as a gel or semi-solid at processing temperatures (for instance, at temperatures in the range 5-90° C., in particular 0.5-100° C.). As such, beads containing a semi-solid or gelatinous core may also be subjected to a wide range of processing and storage conditions without any damage to the bead.

Increasing the viscosity of the aqueous core may be desirable in order to offer an alternative sensory experience upon consumption. As higher viscosity cores dissipate more slowly in the mouth, the flavour, cooling or other sensation will linger on the palate once the bead has ruptured. This may be desirable in some applications, in particular where the beads have not been incorporated into a comestible product, but are being sold and consumed as a product per se. In such cases, a lingering of taste will not interact with or mask the other flavours of a comestible into which the bead has been incorporated, and may be desirable to prolong the sensory effect of the bead after rupturing or dissolution.

Where the aqueous core is in the form of a gel or semi-solid it is preferred that the viscosity of the core be in the range 5000-250,000 cps. In many embodiments the viscosity will be in the range 10,000-100,000 cps for a semi-solid aqueous core and in the range 100,000-200,000 or 250,000 cps for a gel.

Hydrophobic First Coating Layer

The hydrophobic first coating layer surrounds the aqueous core. It is preferred that this layer comprise an oil or a fat. In some examples the hydrophobic first layer will be selected from animal fat, vegetable fat, cocoa butter, and combinations thereof. The presence of cocoa butter, whether alone or possibly in combination with animal and/or vegetable fat is preferred. It is particularly preferred that the aqueous core be a carbohydrate syrup and the hydrophobic first coating layer be cocoa butter.

Typically, the hydrophobic first coating layer will have a melting point in the range 30-40° C., often in the range 30-35° C. A melting point in this range is desirable as the first coating layer will be solid at typical room temperatures facilitating storage and processing but will melt in the mouth to release the aqueous core.

The aqueous core material is typically in the range 20-85 wt %, often 40-80 wt %, in preferred examples 60-75 wt % of the aqueous core material and hydrophobic first coating layer mixture.

In some embodiments, not all of the aqueous material will disassociate completely from the hydrophobic material and therefore, the first hydrophobic coating layer may comprise, or additionally comprise an emulsion.

Hydrophilic Second Coating Layer

The hydrophilic second coating layer is preferably solid, this layer may be a soft or hard coating within the meaning known in the confectionery art and understood by the person skilled in the art. In particular, the hydrophilic second coating layer may be a soft or hard panned coating layer, often a sugar coating. The presence of a solid outer coating maintains the integrity of the bead during storage and incorporation into comestible products. This is particularly important as the first coating layer will often be in a liquid state at the processing temperatures used.

The hydrophilic second coating layer may also optionally contain sweeteners (including bulk and intense sweeteners), cooling agents, carboxylic acid salts, colourings, flavourings, warming agents, tingling agents, taste potentiators, umami, kokumi, saltiness, breath fresheners, oral care products (including tooth whiteners, stain removers, anti-calculus agents, remineralisation agents and anti-plaque agents), pharmaceuticals (including medications, herbs, and nutritional supplements), antibacterial agents, preservatives, antioxidants, and combinations thereof.

In some embodiments it is preferred that the hydrophilic second coating material offer a cooling effect, in such instances, this will typically be obtained by adding a sugar alcohol to the hydrophilic second coating composition.

Where present, either to offer a cooling effect or as a bulk sweetener, the sugar alcohol will typically be derived from a disaccharide or monosaccharide, for instance, erythritol, isomalt, lactitol, maltitol, mannitol, sorbitol, xylitol, or any combination thereof. Particularly preferred sugar alcohols include maltitol, xylitol, mannitol, erythritol and sorbitol. The sugar alcohols which are most preferred for providing the desired cooling effect are sorbitol, xylitol and erythritol. It is also generally desirable that any sugar alcohol present be included as small crystals, as it is this crystalline form which offers the most effective cooling sensation upon consumption.

Where added to provide a cooling effect, it is preferred that the sugar alcohol (and/or other cooling agent) comprise from 10-99 wt % of the hydrophilic second coating layer, often 60-90 wt % and in some instances 5-100 wt %, of the hydrophilic second coating layer.

These optional components will be present at levels typical for coatings of this nature. For instance, where present, the level of flavouring and colouring used, will depend heavily upon the nature of the flavouring or colouring and the intensity of flavour/colour required, as would be readily understood by the person skilled in the art. However, in general, the flavouring or colouring are each independently present in amounts from 0.001-5.0 wt % and, more specifically, from 0.05-4.0 wt %, and even more specifically, 0.1-3.0 wt % of the hydrophilic second coating layer.

The sweeteners may optionally be selected from those described above with reference to the aqueous core material. The bead may, in some instances, be substantially sugar free.

The bead will typically be of diameter in the range about 0.1-about 10 mm, often in the range about 0.5-about 5 mm, in some embodiments in the range about 1-about 3 mm. The axis of measurement of the diameter is the diameter across the longest axis of the bead.

The relative proportions of the aqueous core, hydrophobic first coating layer and hydrophilic second coating layer may be varied as appropriate for the specific application of the bead as would be known to the person skilled in the art. However, typically the aqueous core will comprise from 10-87 wt %, often from 30-70 wt % of the bead. The first coating layer will comprise 3-30 wt % and preferably 5-20 wt % of the bead, and the second coating layer will comprise 10-60 wt %, often 15-45 wt % of the bead.

When consumed the bead will typically offer a soft or crunchy texture upon initial bite, followed by a sweetness which wanes as the hydrophilic second coating layer dissolves. Where the aqueous core is a sweet centre, this is followed by a second wave of sweetness as the hydrophobic first coating layer dissolves and the aqueous core is released.

In one especially preferred embodiment, the aqueous core will contain cooling agents. Where this is the case the particularly pleasant sensation of cooling is released when the bead is ruptured, or where the outer layers are dissolved. In some instances, both the hydrophobic second coating layer and the aqueous core will include cooling agents. Where this is the case a sensation of cooling may be followed by warming, followed by further cooling is obtained as the bead dissolves in the mouth. Such a sensation is not only unusual, but also soothing and pleasing to the consumer.

Comestibles

The comestible of the invention will preferably be a confectionery product. The confectionery product may be a candy, chocolate, chewing gum product or a combination thereof.

Candy products are products which are generally primarily sugar based, for instance, chewy candy, hard boiled candy, jelly candy and other candies, specific examples of which include caramel, toffee, fudge, praline, tablet, gumdrops, jelly beans, rock candy, lollipops, taffy, cotton candy, candy canes, peppermint sticks, peanut brittle, sucking candy, lozenges and candy bars. Additionally, the candy may be coated with a hard or soft shell and/or centre-filled.

The comestible may also be a chewing gum, which may be uncoated or coated with a hard or soft shell. Further, as with candy comestibles, the chewing gum may be centre-filled.

Chocolate products are those which are generally primarily cocoa based and include, for instance, white, milk and dark chocolate and products which are primarily formed of chocolate, for instance, products including dispersions of secondary ingredients such as fruit, nuts, nougat or the inventive beads. Chocolate-style products include those made from chocolate alternatives such as carob.

Combination products would include, for instance, chocolate coated candies and candy centred chewing gums.

The beads may comprise in the range 0.01-95 wt % of the confectionery product, often 0.01-50 wt %, in some embodiments 0.01-10 wt %. Further, the beads may be substantially evenly distributed throughout the product to provide a taste sensation (such as a liquid burst) which occurs throughout consumption of the product (for instance in every bite), and which has a slightly delayed onset, the flavour of the bead being detected after the flavour of the product per se. Alternatively, the beads may be present in one region or zone only. For instance, the beads may be present in the chewing gum zone of a centre-fill chewing gum only. Alternatively, the beads may be present in a chocolate zone only of a toffee and chocolate product, or vice versa. In addition, within a zone, or within the product as a whole, the beads may be found mostly in one region, for instance along one side of a chocolate product.

As used herein the term "region" is intended to refer to a part of a product which is substantially continuous with other parts of the product and for which there is no clearly defined demarcation between regions. For instance, within a chocolate bar regions could be defined by spatial position, so that there could be a region at the left end, or the top. Such a region may or may not contain a higher density of beads than other regions. Conversely, when used herein the term "zone" is intended to refer to a continuous area which differs in some respect from adjacent zones, and for which the transition between zones is readily evident. For instance, a centre-fill, coated, chewing gum pellet has three distinct zones, the centre fill, the chewing gum and the coating.

In some products the bead will be substantially entirely encased within the product, offering a sensory experience (such as, where the aqueous core is liquid, a liquid burst) with a delayed onset and which will continue for a longer chew period. In other embodiments the beads may be at least partially adhered to or embedded on the surface the product so that the sensory experience of the bead is provided when the product is first placed in the mouth.

The product will often be opaque, but it is sometimes preferred that it be partially or wholly transparent or translucent. In such embodiments it is preferred that the beads be opaque and optionally coloured to provide a pleasing aesthetic appearance to the product. It is particularly preferred that the product be partially or wholly transparent or translucent where the product is a candy product, such as a hard candy, and wherein the beads are encased within the candy product as this offers a particularly pleasing visual effect. In such cases it is often preferred that the candy be wholly transparent or translucent.

Where the bead includes flavourings, the product and the bead may be selected so as to have complementary flavours, for instance a chewing gum product could be prepared wherein the gum has a vanilla flavour and the beads contain a liquid core so that a liquid burst of strawberry flavour is provided during chew. Alternatively, a chocolate bar could contain a region of whisky flavoured beads, or a hard lemon candy could incorporate honey flavoured beads. Further, chewing gums are envisaged which have a mild flavour and contain the "cooling" beads described above (i.e. beads in which the aqueous core material and the hydrophilic second coating layer include a cooling agent). Such a gum would offer a pleasant mild tasting chew interspersed with periods of strong cooling as a bead is ruptured or a layer within the bead dissolved.

Optional Components

The comestible of the invention may include a variety of optional components as would be familiar to one skilled in the art, at levels typical for the nature of the components. The optional components may be used alone or in combination and include, for instance, sweeteners (including bulk and intense sweeteners), cooling agents, carboxylic acid salts, colourings, flavourings, warming agents, tingling agents, taste potentiators, umami, kokumi, saltiness, lubricants, breath fresheners, oral care products (including tooth whiteners, stain removers, anti-calculus agents, remineralisation agents and anti-plaque agents), pharmaceuticals (including medications, herbs, and nutritional supplements), antibacterial agents, preservatives, antioxidants, and combinations thereof.

Preparation

The beads may be prepared by any conventional micro capsulation method known in the art. In addition, the beads may be prepared using an ice-quenching technique or a jet cutting technique.

In many embodiments an emulsion of the aqueous core material and the hydrophobic first coating material will be formed at a temperature above the melting point of the hydrophobic first coating material. The emulsion formed is preferably a "water-in-oil" type emulsion. Often the temperature used will be only slightly above the melting temperature of the highest melting point component (where the aqueous core is in liquid form this will be the hydrophobic first coating material; where the aqueous core is a gel, this may be either the gel or the hydrophobic first coating material), for instance in the range 40-60° C., in some examples 40-50° C. The use of such temperatures minimises energy wastage whilst ensuring that both the aqueous core material and the hydrophobic first coating material are in liquid form so that emulsion formation and droplet formation is facilitated.

Droplets of emulsion will then be formed, for instance by cooling to below the melting point of the hydrophobic first coating material. This will preferably be achieved by cooling in water.

Once formed, it is preferred that the droplets are stored at a temperature below the melting point of the hydrophobic first coating material to prevent disintegration of the droplet and release of the aqueous core material. In many instances, the droplets will be stored at a temperature below 25° C., often at a temperature in the range 0-20° C., in many cases at a temperature in the range 5-18° C., preferably at temperature in the range 10-15° C. as this latter temperature has been found to offer droplet stability without requiring the expenditure of unnecessary energy in cooling the droplets.

In some instances it may be desirable to coat the droplets with a powder to prevent adhesion. The powder may be any powder compatible with the intended use of the bead. In many cases it may be preferable to coat the droplets with a substantially flavourless, non-aromatic powder, however where the droplet is a sweet droplet, a sweet powder may be preferable and where the droplet is a sour droplet a sour powder may be preferable. In some embodiments it may be appropriate to mix different types of flavour to create flavour mixtures or simply to modify the levels of sweetness, sourness or other flavours present in the droplet. Powders which could be used to prevent adhesion include finely powdered sugar (such as icing sugar), powders containing alternative sweeteners, citric acid powder or combinations thereof.

The droplets are then coated with a second coating material. The coating material may be applied using any conventional technique known in the art but will preferably be applied using a panning process, typically a soft panning process although hard panning techniques may also be applied.

The resulting bead may then be consumed without further processing, for instance as a refreshing confectionery product or incorporated into a comestible product, for instance a confectionery product as described above.

A confectionery product containing the inventive beads may be prepared by embedding one or more beads on the surface of the product; mixing one or more beads into at least a portion of the product so that they are substantially entirely encased within the product; or a combination thereof. For these purposes the beads may be treated and processed in a manner similar to many other confectionery ingredients such as toffee chunks, nougat chunks, nuts or fruit pieces. However, the beads have the advantage that they are stable to a high temperature, allowing processing and incorporation into, for instance, hard candies without any degradation of the bead. It is preferred that the beads be stable up to a temperature of about 80° C., preferably 90° C. or 100° C. As a result, the beads can be processed at temperatures in the range 70-80° C., as is required for the production of hard candies.

Unless otherwise stated each of the integers described in the invention may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims.

Unless otherwise stated all percentages appearing in the specification are percentages by weight of the composition being described. In addition, unless otherwise stated, all numerical values appearing in this application are to be understood as being modified by the term "about".

EXAMPLES

In order that the present invention may be more readily understood, it will be described further with reference to the specific examples and the accompanying drawings, in which:

FIG. 1 is a simplified cross-sectional view of a bead in accordance with the present invention;

FIG. 2 is a simplified cross-sectional view of a bead in accordance with a second embodiment of the present invention;

FIG. 3 is a simplified cross-sectional view of a bead in accordance with a third embodiment of the present invention;

FIG. 4 is a simplified cross-sectional view of a bead in accordance with a fourth embodiment of the present invention; and FIG. 5 is a simplified cross-sectional view of a confectionery product incorporating a plurality of beads in accordance with the present invention.

With reference to FIG. 1, there is shown a simplified view of a bead 10 which has an aqueous core 12 surrounded by a hydrophobic layer 14 formed from an emulsion. The hydrophobic layer 14 is in turn surrounded by a hydrophilic layer 16 formed of a soft-panned sugar coating.

Referring to FIG. 2, there is shown a simplified view of a second embodiment of a bead 20 which has small multiple aqueous portions 22 dispersed throughout a large hydrophobic emulsion portion 24. The hydrophobic emulsion 24 is surrounded by a hydrophilic layer 26 formed of a soft-panned sugar coating.

In FIG. 3, there is illustrated a simplified view of a third embodiment of a bead 30 which has small multiple aqueous portions 32 dispersed throughout a hydrophobic fat portion 34. The hydrophobic fat portion 34 is surrounded by a hydrophilic layer 36 formed of a soft-panned sugar coating.

With reference to FIG. 4, there is shown a simplified view of a fourth embodiment of a bead 40 which has a number of small aqueous portions 46, each of which are surrounded by a hydrophobic layer 44 which is formed from an emulsion 46. The aqueous portions 46 which are surrounded by the hydrophobic layers 44 are dispersed throughout a fat portion 42. The hydrophobic fat portion 42 is surrounded by a hydrophilic layer 48 formed of a soft-panned sugar coating.

Lastly, with reference to FIG. 5, there is shown a simplified view of a confectionery product 50 in the form of a chocolate bar 52 which incorporates two beads 10 of the first embodiment as described above. Alternatively, or additionally, a plurality of beads as illustrated in FIGS. 2-4 could be included in the chocolate bar 52.

Ice Quenching

The beads of the invention may be prepared using an ice-quenching technique. An emulsion of aqueous core material and hydrophobic first coating material may be prepared using standard techniques (for instance, mixing) at a temperature of about 45° C. The aqueous core material in this example is an aqueous 10% sugar solution and the first coating material is cocoa butter.

The emulsion is deposited drop wise into iced water thereby causing droplets to form as the cocoa butter solidifies. The droplet size is in the range 1-3 mm. The solid droplets are then filtered from the iced water, dried and coated with icing sugar to prevent sticking.

The coated droplets are soft panned to produce a soft coating by placement in a coating pan and coating with an appropriate carbohydrate syrup, for example, a combination of sucrose syrup and glucose syrup or a solution of maltitol powder and maltitol syrup. The droplets may again be coated with icing sugar or suitable polyol and this two-step process repeated until a sugar layer has been built up on the fat droplets resulting in an bead of the invention. Alternatively a hard panning process may be used with the appropriate carbohydrates.

Jet Cutting

The beads of the invention may be prepared using a jet cutting technique such as discussed in DE 4424998 and U.S. Pat. No. 6,467,699 (both to Klaus-Dieter Vorlop) the disclosures of which are hereby incorporated by reference in their entirety.

An emulsion of aqueous core material and hydrophobic first coating material may be first prepared using standard techniques at a temperature of about 45° C. The aqueous core material in this example is an aqueous 8% sugar solution containing 0.2% strawberry flavouring and the first coating material is cocoa butter.

The emulsion is then ejected under pressure from a nozzle and mechanically separated into defined slugs. Division occurs by the physical removal of sections of the jet, leaving distinct slugs of emulsion to continue along the trajectory of the original jet. The slugs of emulsion reorder themselves to become approximately spherical before they are passed into a hardening environment such as a refrigerated portion of the cutting apparatus.

Due to partial separation of the constituents of the emulsion during processing, the droplets formed are in the configuration of small confectionery beads comprising one or more aqueous cores which are surrounded by the emulsion. In this example, each bead is roughly spherically formed from an emulsion of the aqueous 8% sugar solution containing 0.2% strawberry flavouring and cocoa butter—where the aqueous sugar solution (and optionally) the 0.2% strawberry flavouring partially disassociates from the emulsion so as to form small pockets of aqueous material throughout the emulsion. However, the example can be adapted so that only a single pocket of aqueous material is disposed within the emulsion.

The droplets may then be soft or hard panned as described above.

Example Bead Composition

A bead is prepared in accordance with the invention from the components listed below using the ice quenching technique described above:

| Component | Approximate Level |
|---|---|
| Aqueous core of: | 60 wt % of the entire bead |
| 15 wt % solution of sugar in water | 99.3 wt % of the aqueous core |
| Strawberry flavour | 0.5 wt % of the aqueous core |
| Carmoisine colouring (red) | 0.2 wt % of the aqueous core |
| Hydrophobic first coating layer of: | 15 wt % of the entire bead |
| Cocoa butter | 100 wt % of the hydrophobic first coating layer |
| Hydrophilic second coating layer of: | 25 wt % of the entire bead |
| 40 wt % solution of sugar in water | 50 wt % of the hydrophilic second coating |
| Icing sugar | 50 wt % of the hydrophilic second coating |

Example Cooling Bead Composition

A bead is prepared in accordance with the invention from the components listed below using the jet cutting technique described above:

| Component | Approximate Level |
|---|---|
| Aqueous core of: | 50 wt % of the entire bead |
| Acesulfame-K | 1 wt % of the aqueous core |
| Xylitol | 50 wt % of the aqueous core |
| Mint flavour | 0.5 wt % of the aqueous core |
| Water | QS |
| Hydrophobic first coating layer of: | 20 wt % of the entire bead |
| Cocoa butter | 100 wt % of the hydrophobic first coating layer |
| Hydrophilic second coating layer of: | 30 wt % of the entire bead |
| 40 wt % solution of xylitol, and 2 wt % acesulfame-K in water | 50 wt % of the hydrophilic second coating |
| Icing sugar | 50 wt % of the hydrophilic second coating |

Example Chewing Gum Composition Containing Beads

A chewing gum tablet is prepared using conventional techniques. The beads of the invention are incorporated into the gum base by mixing until evenly distributed.

| Component | Approximate Level (wt %) |
|---|---|
| Gum base | 27.27 |
| Raspberry Flavoured beads | 5.0 |
| Sorbitol | 55 |
| Xylitol | 6.0 |
| Acesulfame-K/aspartame | 1.2 |
| Peach flavouring | 3.6 |
| Colloidal silica | 0.49 |
| Magnesium stearate | 1.44 |

Example Candy Composition Containing Beads

A hard candy is prepared by adding the beads to a molten sugar candy composition at a temperature of approximately 75° C. and mixing until evenly distributed. The candy is then poured into moulds to cool. The resulting hard candy is translucent pink through which the pink beads are visible. The composition is as outlined below.

| Component | Approximate Level (wt %) |
|---|---|
| Sugar | 42.7 |
| Polydextrose | 34.8 |
| Citric acid | 0.2 |
| Cherry flavour | 0.1 |
| Red Coloured beads | 8.0 |
| Canthaxanthin Colouring (pink) | 0.05 |
| Water | 14.15 |

It should be appreciated that the compositions and methods of the invention are capable of being incorporated in the form of a variety of embodiments, only a few of which have been illustrated and described above.

The invention claimed is:

1. A method of preparing a confectionery product comprising the steps of:
   a. preparing an emulsion of an aqueous core material and a hydrophobic first coating material;
   b. forming droplets of emulsion, thereby providing a droplet with an aqueous core and a hydrophobic first coating layer;
   c. coating the droplets with a hydrophilic second coating material to form beads with a second coating layer surrounding the first coating layer, wherein the hydrophilic second coating layer is a panned sugar coating; and
   d. incorporating a plurality of the beads into the confectionery product.

2. A method according to claim 1 wherein the emulsion is formed at a temperature above the melting point of the hydrophobic first coating material and the aqueous core.

3. A method according to claim 2 wherein the droplets of emulsion are cooled to below the melting point of the hydrophobic first coating material.

4. A method according to claim 1 comprising the additional step of coating the droplets formed in step b with a powder.

5. A method according to claim 1 wherein the emulsion droplets are coated in a panning process.

6. A method according to claim 5 wherein the panning process is a soft panning process.

7. A method according to claim 5 wherein the panning process is a hard panning process.

8. A method of preparing a confectionery product according to claim 1 comprising a step selected from: embedding a plurality of the beads on the surface of the product; mixing a plurality of the beads into at least a portion of the product so that they are substantially entirely encased within the product; or a combination thereof.

9. A method according to claim 1 wherein the product is selected from a chocolate product, candy, chewing gum or a combination thereof.

\* \* \* \* \*